United States Patent
Krivenok et al.

(10) Patent No.: US 12,393,374 B2
(45) Date of Patent: Aug. 19, 2025

(54) SYSTEM AND METHOD FOR PROVIDING ON-DEMAND HIGH-AVAILABILITY SERVICE ON A STORAGE CLUSTER

(71) Applicant: Dell Products L.P., Round Rock, TX (US)

(72) Inventors: Dmitry Krivenok, Dublin (IE); Yuval Harduf, Yahud (IL); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 18/464,820

(22) Filed: Sep. 11, 2023

(65) Prior Publication Data

US 2025/0085899 A1    Mar. 13, 2025

(51) Int. Cl.
*G06F 3/06* (2006.01)

(52) U.S. Cl.
CPC .......... *G06F 3/067* (2013.01); *G06F 3/0604* (2013.01); *G06F 3/0655* (2013.01)

(58) Field of Classification Search
None
See application file for complete search history.

(56) References Cited

U.S. PATENT DOCUMENTS

| | | | |
|---|---|---|---|
| 2008/0215734 A1* | 9/2008 | Walker | H04L 41/12 709/226 |
| 2012/0084626 A1* | 4/2012 | Pandey | G06F 3/0605 714/E11.03 |
| 2015/0055489 A1* | 2/2015 | Lida | H04L 67/51 370/242 |
| 2018/0253260 A1* | 9/2018 | Marripudi | G06F 3/064 |
| 2020/0204449 A1* | 6/2020 | Bitterfeld | G06F 16/27 |
| 2022/0103622 A1* | 3/2022 | Camargos | G06F 3/0626 |

* cited by examiner

*Primary Examiner* — Stephanie Wu
(74) *Attorney, Agent, or Firm* — Brian J. Colandreo; Heath M. Sargeant; Holland & Knight LLP (57) ABSTRACT

A method, computer program product, and computing system for providing on-demand high-availability service on a storage cluster. A new single-node appliance is added to the storage cluster, the storage cluster includes one or more original single-node appliances and an internal remote system configured to facilitate intra-cluster orchestration operation. A remote system object representing the new single-node appliance is generated in the internal remote system. An appliance identifier for the remote system object representing the new single-node appliance is determined. In response to determining that the appliance identifier is a non-zero appliance identifier, an internal remote session between the remote system object and the storage cluster is established. The one or more original single-node appliances and the new single-node appliance are presented as a unified system. Protected storage volumes are provisioned on any of the single-node appliances included in the unified system.

17 Claims, 9 Drawing Sheets

SYSTEM AND METHOD FOR PROVIDING ON-DEMAND HIGH-AVAILABILITY SERVICE ON A STORAGE CLUSTER

BACKGROUND

Embodiments disclosed herein relate generally to systems and methods for selectively increasing and/or decreasing application service availability for enterprise storage clusters deployed in edge environments. Edge computing refers to a distributed computing framework that brings enterprise applications closer to data sources such as the Internet of Things (IoT) devices or local edge servers. This proximity to data at its source can deliver strong business benefits, including faster insights, improved response times, and better bandwidth availability.

Typically, modern enterprise storage systems provide great data services, resiliency, and high availability. There are multiple approaches to achieving high availability such as leveraging purpose-built reliable hardware with redundant components, or by using multiple less reliable standard servers with advanced software stack providing high availability on top of unreliable components. However, such approaches tend to work better in datacenter environments and to perform sub-optimally in edge environments. For example, enterprise storage systems leveraging purpose-built hardware may not be directly used at the edge due to environmental/hardware constraints related to operating in harsh environments. High availability implementation in those systems depend on hardware features and cannot be used without providing purpose-built hardware optimized specifically for the edge environments (e.g., power constraints, chassis size constraints and non-rack installation, etc.) or by doing a large-scale re-architecture of a high availability subsystem for a mirrored backend.

Edge environments are generally required to support starting configurations as small as a single node, without any ability to provide high availability, and then scale out on-demand services later on to achieve high availability. Scale-out shared-nothing enterprise storage systems usually do not scale down to a single node starting deployment and require significant changes to do so, while scale-up shared-storage systems usually do not scale beyond two nodes.

The costs involved can also be extremely prohibitive. In addition to supporting small starting configurations, edge deployments should also support granular scaling (i.e., going from one node to two nodes and not from one node to three nodes) and reasonable storage efficiency, because not all data at the edge is very important, and paying the storage overhead for every volume is often a significant waste of resources.

Lastly, very few systems support distributed mirroring for two node configurations and there are many challenges related to supporting all high availability scenarios, implementing delta tracking and sync on node failures, performing upgrades from one node to two nodes, etc.

SUMMARY OF DISCLOSURE

In one example implementation, a computer-implemented method for providing on-demand high-availability service on a storage cluster may include, but is not limited to adding a new single-node appliance to the storage cluster, wherein the storage cluster includes one or more original single-node appliances and an internal remote system configured to facilitate intra-cluster orchestration operation. A remote system object representing the new single-node appliance is generated in the internal remote system. An appliance identifier for the remote system object representing the new single-node appliance is determined. In response to determining that the appliance identifier for the remote system object representing the new single-node appliance is a non-zero appliance identifier, an internal remote session between the remote system object and the storage cluster is established. The one or more original single-node appliances and the new single-node appliance are presented as a unified system. One or more protected storage volumes are provisioned on any of the single-node appliances included in the unified system.

One or more of the following example features may be included. Where provisioning the one or more protected volumes on any of the single-node appliances includes: selecting a destination appliance to replicate data onto, at least partially based upon predefined criteria, looking for the internal remote system with a matching non-zero appliance identifier, and automatically establishing an internal remote session between single-node appliances in the unified system for a volume from the one or more protected volumes. Where removing a selected single-node appliance from the storage cluster includes: excluding the selected single-node appliance from a list of possible destinations, such that no new protected volumes can be created thereon, and locating and terminating any internal remote sessions to the single-node appliance.

In another example implementation, a computer program product residing on a non-transitory computer-readable medium having a plurality of instructions stored thereon which, when executed by a processor, cause the processor to perform operations that include: adding a new single-node appliance to the storage cluster, wherein the storage cluster includes one or more original single-node appliances and an internal remote system configured to facilitate intra-cluster orchestration operation. A remote system object representing the new single-node appliance is generated in the internal remote system. An appliance identifier for the remote system object representing the new single-node appliance is determined. In response to determining that the appliance identifier for the remote system object representing the new single-node appliance is a non-zero appliance identifier, an internal remote session between the remote system object and the storage cluster is established. The one or more original single-node appliances and the new single-node appliance are presented as a unified system. One or more protected storage volumes are provisioned on any of the single-node appliances included in the unified system.

One or more of the following example features may be included. Where provisioning one or more protected volumes on any of the single-node appliances includes: selecting a destination appliance to replicate data onto, at least partially based upon predefined criteria, looking for the internal remote system with a matching non-zero appliance identifier, and automatically establishing an internal remote session between single-node appliances in the unified system for a volume from the one or more protected volumes. Removing a selected single-node appliance from the storage cluster by excluding the selected single-node appliance from a list of possible destinations, such that no new protected volumes can be created thereon, and locating and terminating all internal remote sessions to each corresponding single-node appliance.

In another example implementation, a computing system for providing on-demand high-availability service on a storage cluster, comprising: a memory and a processor. The processor being configured to: adding a new single-node appliance to the storage cluster, wherein the storage cluster includes one or more original single-node appliances and an internal remote system configured to facilitate intra-cluster orchestration operation. A remote system object representing the new single-node appliance is generated in the internal remote system. An appliance identifier for the remote system object representing the new single-node appliance is determined. In response to determining that the appliance identifier for the remote system object representing the new single-node appliance is a non-zero appliance identifier, an internal remote session between the remote system object and the storage cluster is established. The one or more original single-node appliances and the new single-node appliance are presented as a unified system. One or more protected storage volumes are provisioned on any of the single-node appliances included in the unified system.

One or more of the following example features may be included. Where provisioning one or more protected volumes on any of the single-node appliances includes: selecting a destination appliance to replicate data onto based, at least in part, upon predefined criteria, looking for the internal remote system with a matching non-zero appliance identifier, and automatically establishing an internal remote session between single-node appliances in the unified system for a volume from the one or more protected volumes. Removing a selected single-node appliance from the storage cluster by excluding the selected single-node appliance from a list of possible destinations, such that no new protected volumes can be created thereon, and locating and terminating all internal remote sessions to each corresponding single-node appliance.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
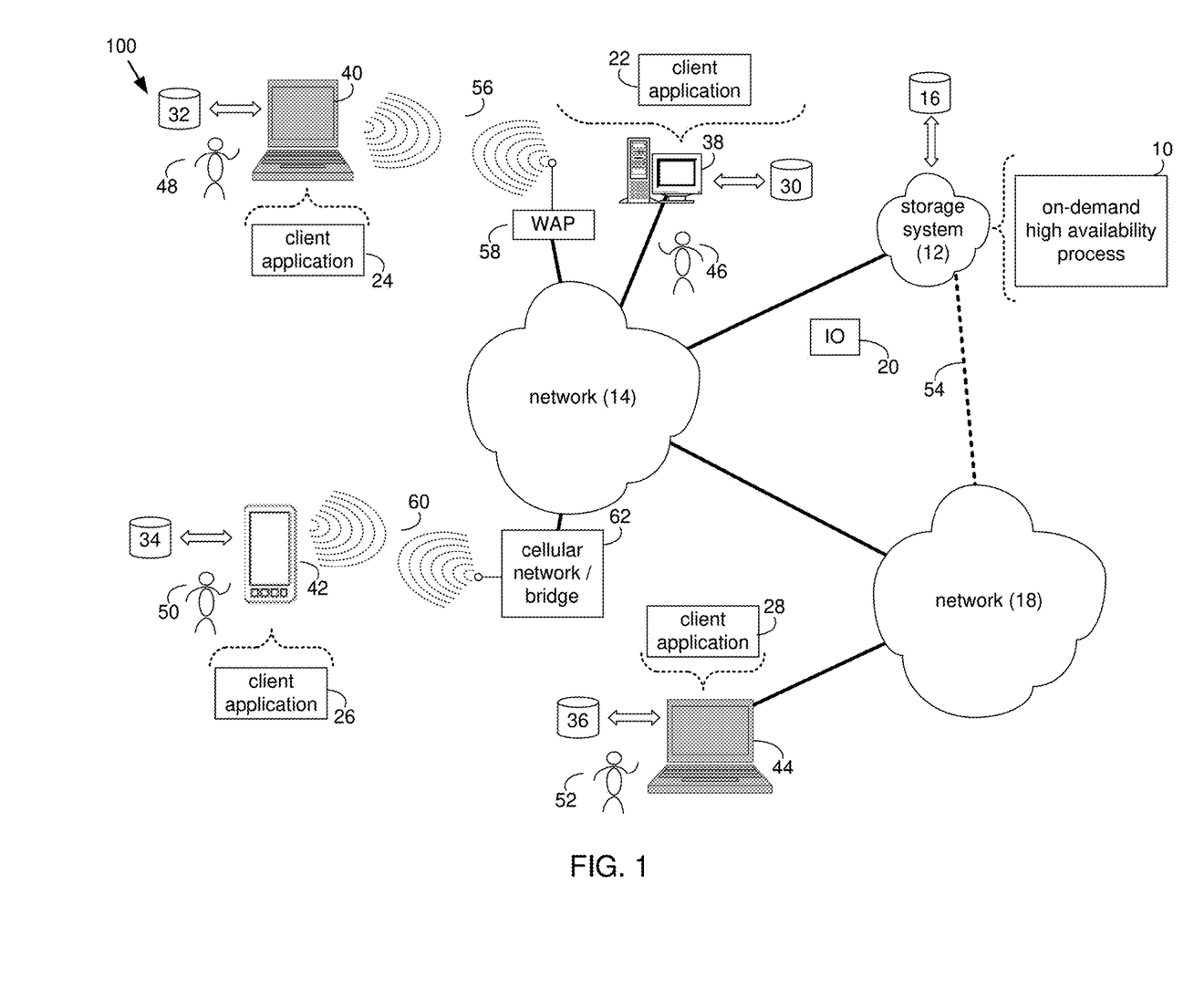
FIG. 1 is an example diagrammatic view of a storage system and an on-demand high availability process coupled to a distributed computing network according to one or more example implementations of the disclosure.

System Overview:

Referring to FIG. 1, there is shown on-demand high availability process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data ownership process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data ownership process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
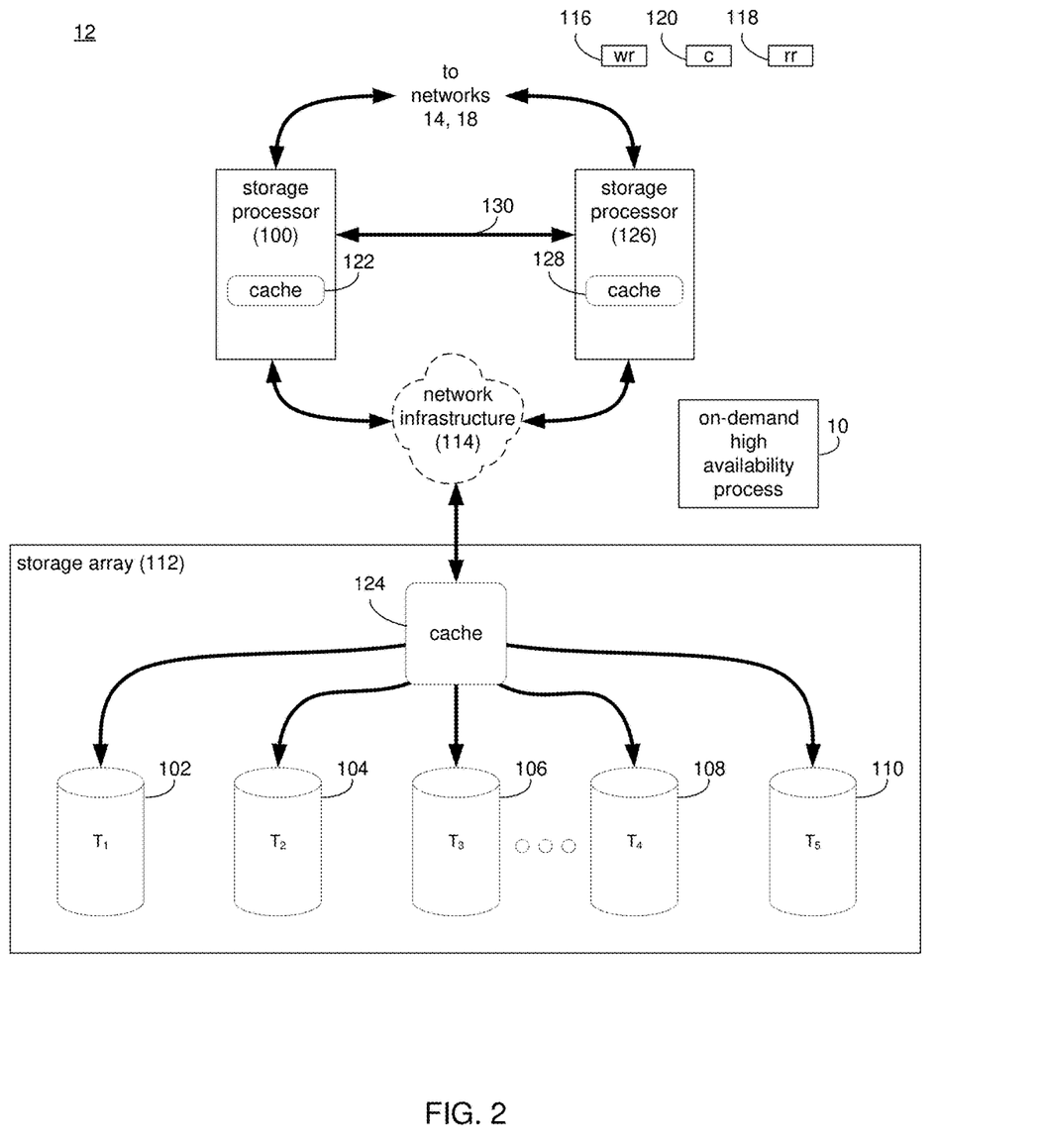
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data ownership process 10. The instruction sets and subroutines of data ownership process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data ownership process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of data ownership process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of data ownership process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of data ownership process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of data ownership process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Figure 3:
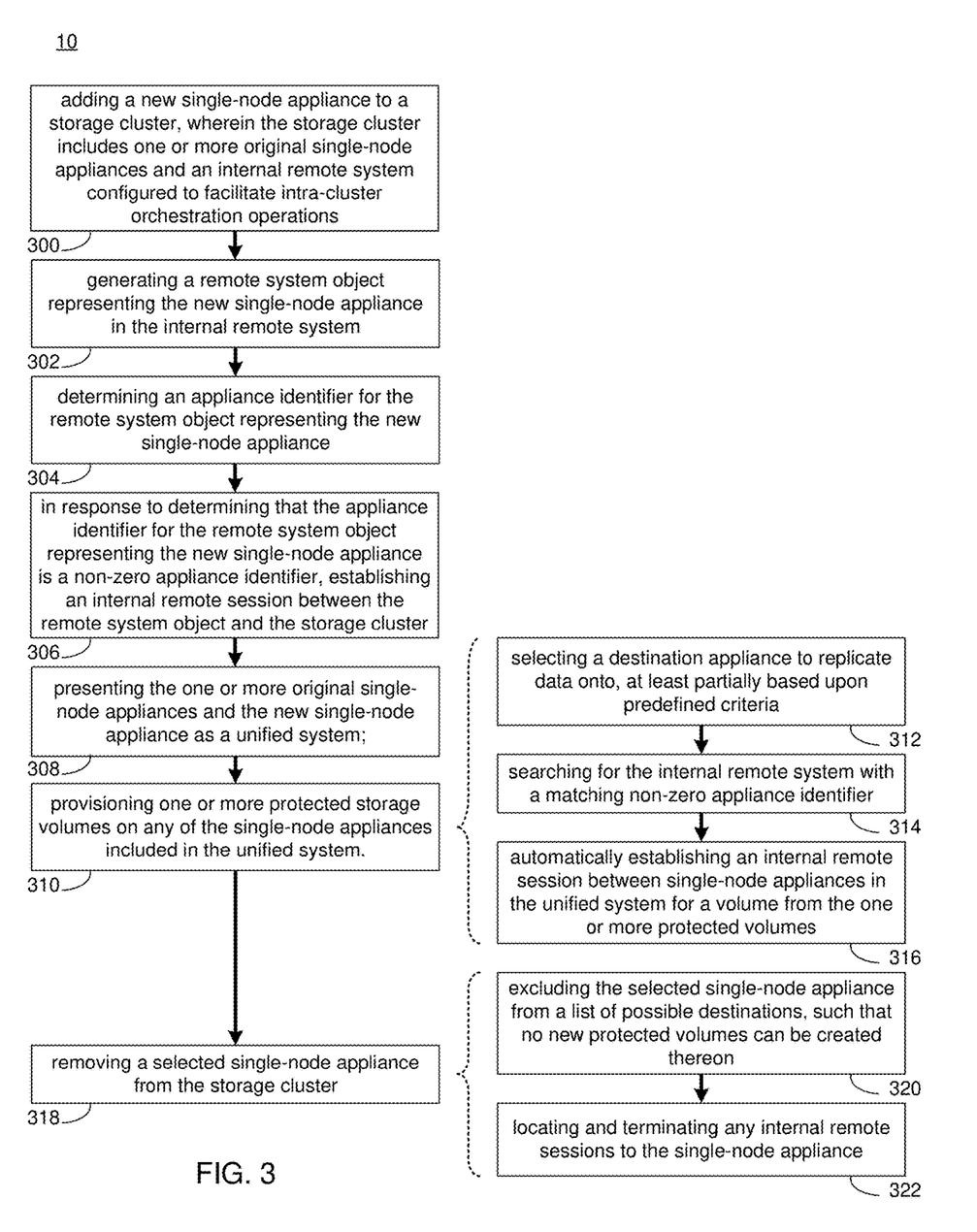
FIG. 3 is an example flowchart of the on-demand high availability process of FIG. 1 according to one or more example implementations of the disclosure.
Figure 4A:
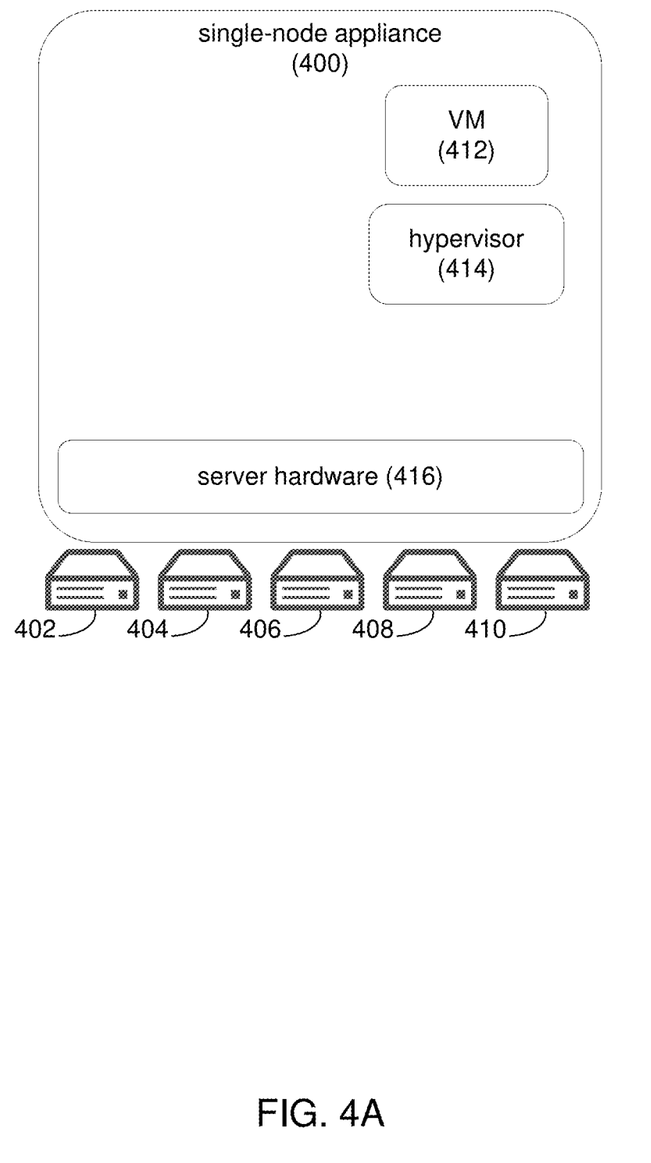
FIGS. 4A-G are example diagrammatic views of the on-demand high availability process of FIG. 1 according to one or more example implementations of the disclosure.
Figure 4B:
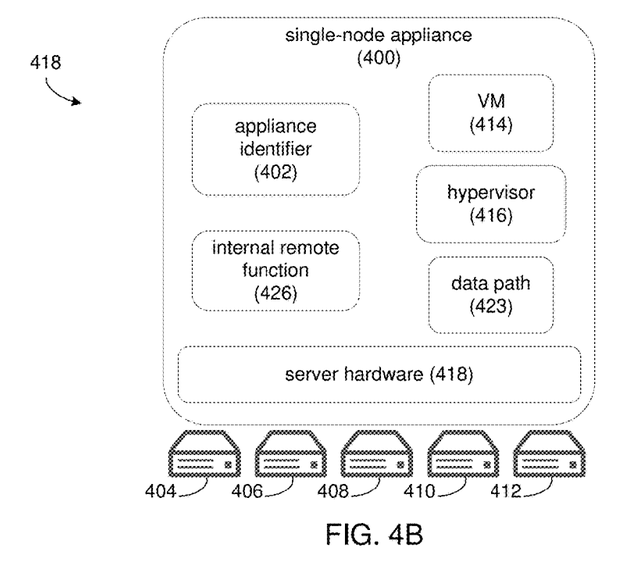
Figure 4C:
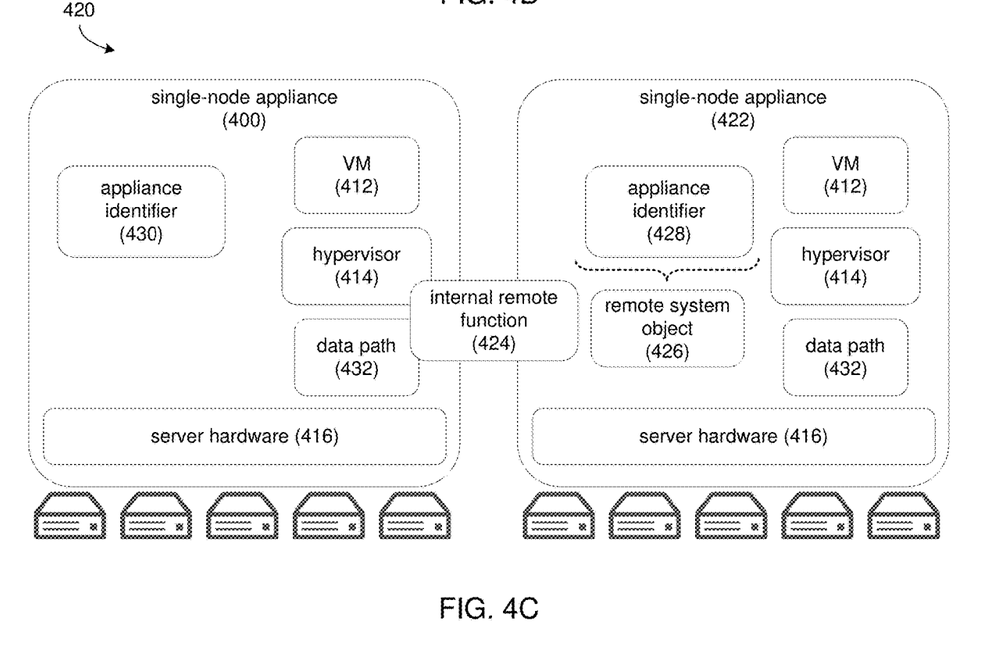
Figure 4D:
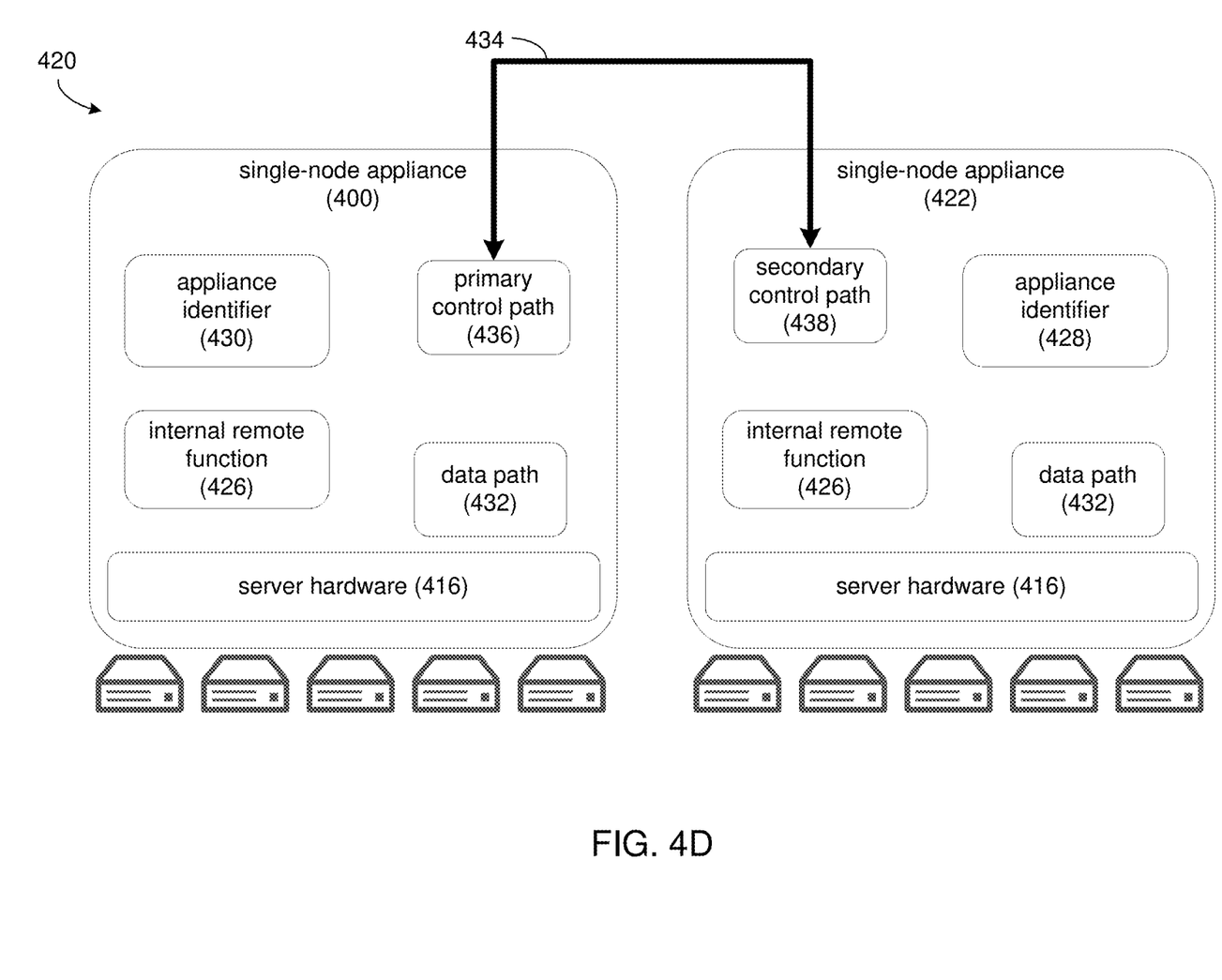
Figure 4E:
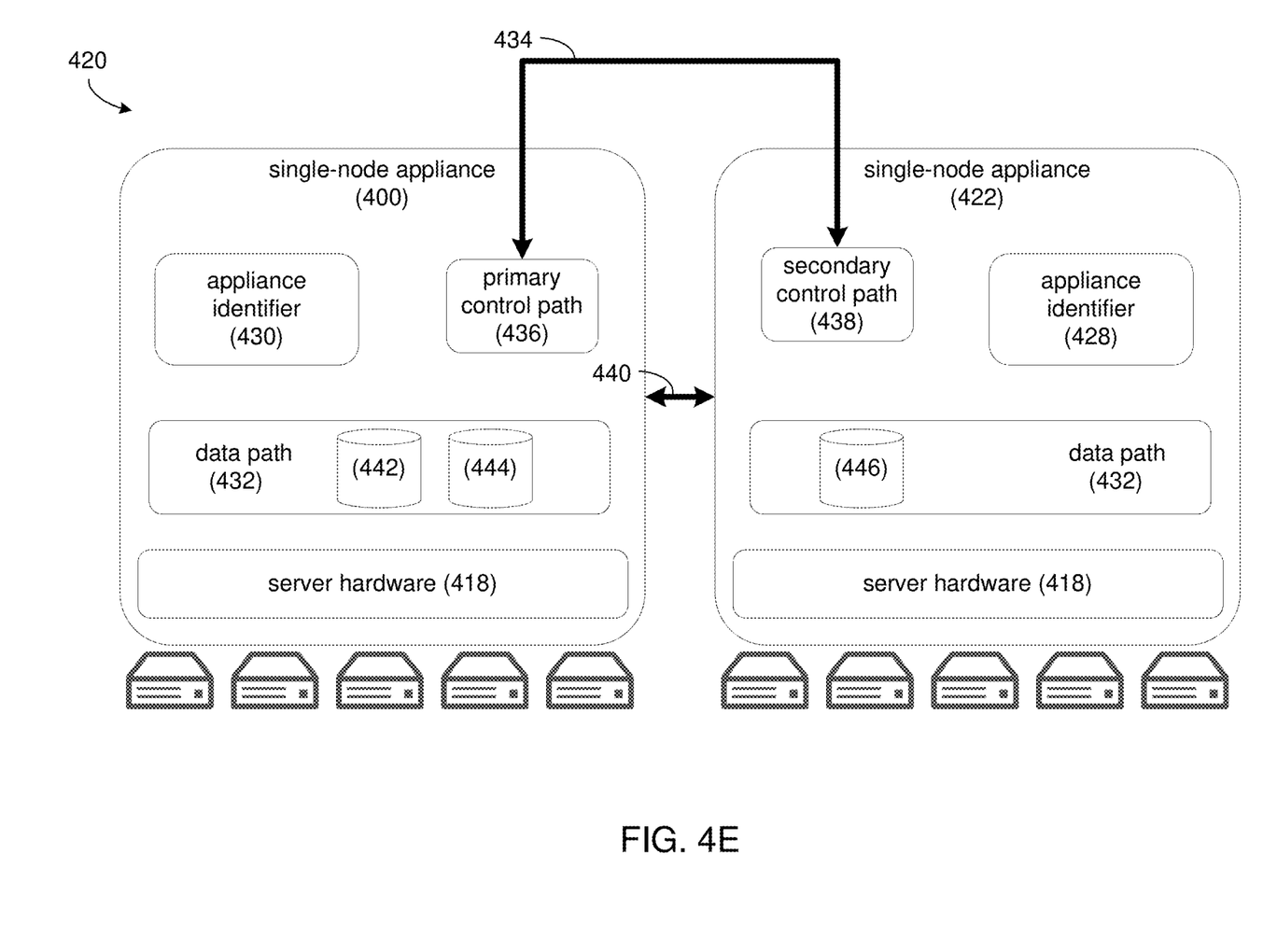
Figure 4F:
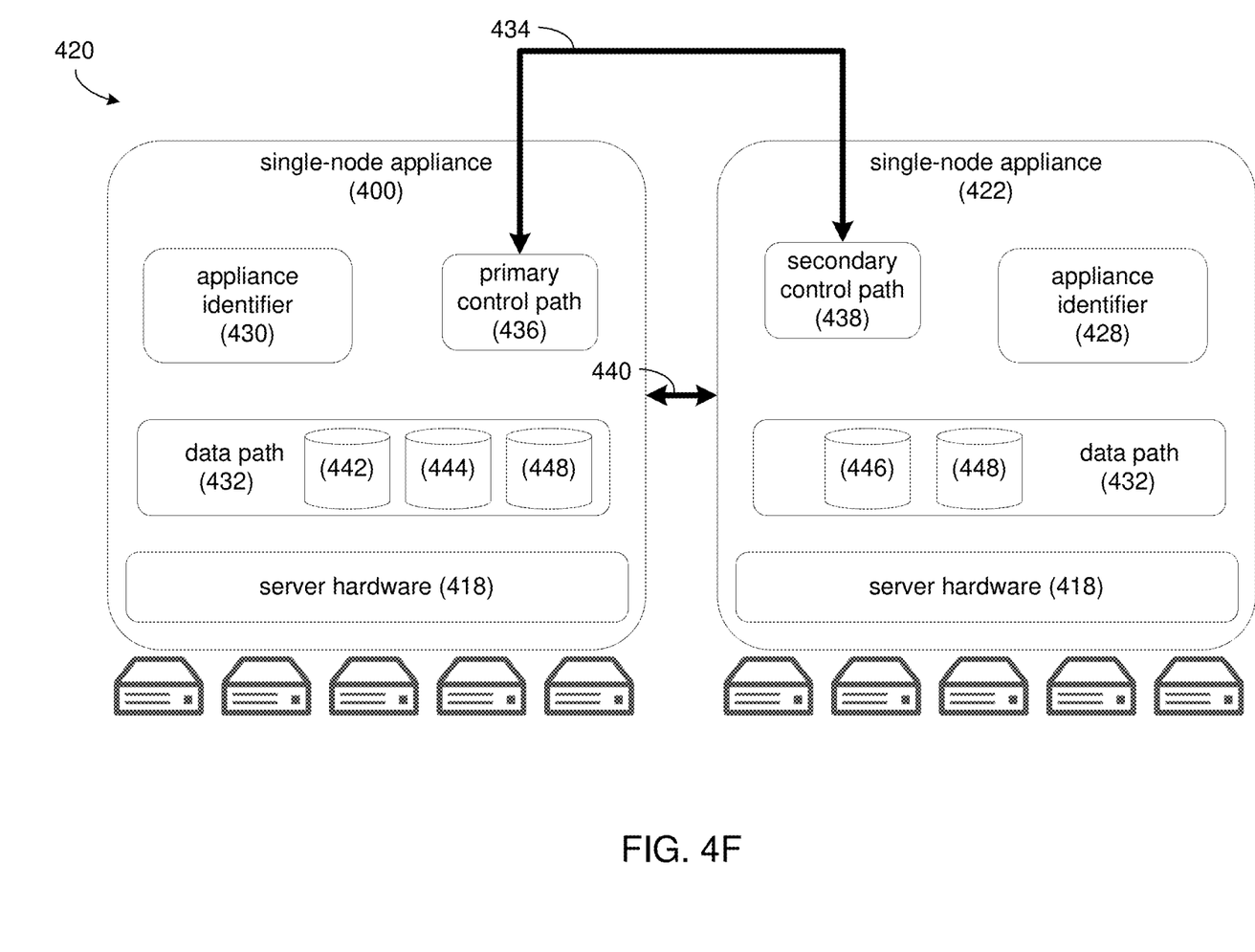
Figure 4G:
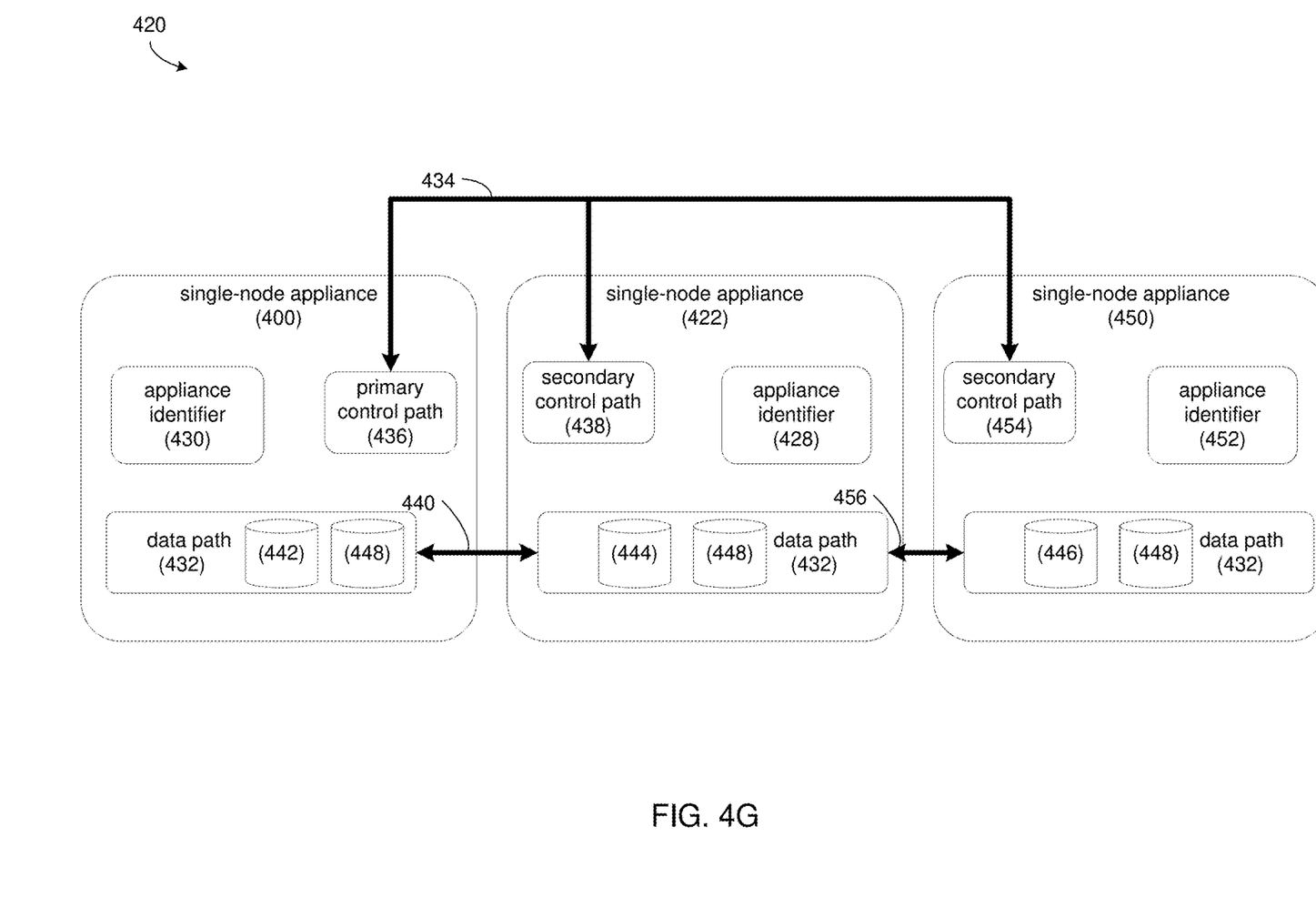

The On-Demand High Availability Process:

Referring also to FIGS. 3-4G and in some implementations, on-demand high availability process 10 may add 300 a new single-node appliance to the storage cluster, wherein the storage cluster includes one or more original single-node appliances and an internal remote system configured to facilitate intra-cluster orchestration operation. A remote system object representing the new single-node appliance is generated 302 in the internal remote system. An appliance identifier for the remote system object representing the new single-node appliance is determined 304. In response to determining that the appliance identifier for the remote system object representing the new single-node appliance is a non-zero appliance identifier, an internal remote session between the remote system object and the storage cluster is established 306. The one or more original single-node appliances and the new single-node appliance are presented 308 as a unified system. One or more protected storage volumes are provisioned 310 on any of the single-node appliances included in the unified system.

In some implementations, on-demand high availability process 10 enables non-high availability deployment of clusters comprising only one single-node appliance and a natural transition to a high availability mode by leveraging existing cluster expansion capability on-demand and as required by the business use-case. This significantly reduces the cost of implementation which is critical in edge environments. In general, edge computing refers to a distributed computing framework that brings enterprise applications closer to data sources such as Internet of Things (IoT) devices or local edge servers. This proximity to data at its source can deliver strong business benefits, including faster insights, improved response times, and better bandwidth availability. On-demand high availability process 10 leverages point-to-point metro-cluster technology within a single cluster (storage federation) to protect any single protected volume, but the architecture allows for a cluster to have three or more single-node appliances. Failure of any single-node appliance will not lead to data unavailable (DU) events for protected volumes. Moreover, with more than three appliance clusters, the system may automatically perform re-protection of protected volumes on the available appliance(s) which is important for edge deployment with much longer customer replaceable unit (CRU)/field replaceable unit (FRU) replacement time.

On-demand high availability process 10 supports two types of volumes enabling improved storage efficiency, lower cost, and higher write performance for less important data, which comprises the majority of data in edge deployments, with high availability and better resiliency for more important data at the cost of lower write performance. Moreover, for edge environments with modern containerized applications performing application-level replication, the usage of standard volumes provides better performance and eliminates double protection. Additionally, on-demand high availability process 10 enables a single point of management and presentation for the system as a single high availability system, instead of two independent systems, and does not require changes to the object model of the storage system (e.g., constructs like cluster, appliance, node, volume stay intact).

On-demand high availability process 10 may be fully applicable to a traditional federation of highly available purpose-built storage appliances if a higher level of availability and resiliency is desired. Protected volumes may sustain the loss of an entire appliance in the cluster. Unlike mirroring solutions, on-demand high availability process 10 may require significantly lower network bandwidth between the nodes because data replication happens at the top of the data path stack, which in turn allows write amplification of the data path stack to not have an impact on backend network traffic. Deduplication storage efficiency will be the same as for the storage system based on native mirroring without "metro" connectivity (i.e., fully mirrored storage systems with an active-active configuration, can provide Recovery Point Objective (RPO) and Recover Time Object (RTO) equal to zero). On-demand high availability process 10 also allows volumes to be configured with non-uniform metro connectivity which improves performance due to lower locking overhead.

Further, on-demand high availability process 10 does not require any changes to the data path of the enterprise storage system, including switching from shared-storage to shared-nothing backend requiring mirroring with delta tracking, support of dynamic redundant array of independent disks (RAID) scheme changes, and handling of high availability events. By leveraging existing metro-cluster high availability implementation, on-demand high availability process 10 may not require changes to the high availability stack. It also may not require changes to a backend layer because each node sees only local drives and does not need to see remote drives via non-volatile memory express over fabrics (NVMe-oF) or other protocols.

In some implementations and referring also to FIGS. 4A-4G, on-demand high availability process 10 may add 300 a new single-node appliance (e.g., new single-node appliance 400) to a storage cluster. Referring now to FIG. 4A, single-node appliance 400 is the basic building block used in on-demand high availability process 10. Each single-node appliance 400 may leverage directly-attached drives (e.g., drives 402, 404, 406, 408, 410), provide RAID protection against drive failures, and provide data services, but may not provide high availability because the node itself is a single point of failure. For example, single-node appliance 400 may include one or more virtual machines (e.g., virtual machine 412), a hypervisor (e.g., hypervisor 414) for configuring virtual machines, and server hardware 416 for communicating with other storage devices and single-node appliances. At the same time, single-node appliance 400 may not require any expensive purpose-built hardware and may run on low-end cost-effective ruggedized servers built with edge deployment requirements in mind. The storage stack may run directly on the server or run inside a virtual machine which is beneficial if storage system is deployed in host controller interface (HCI) mode which is often the case in edge deployments.

In some implementations, on-demand high availability process 10 may add 300 new single-node appliance to a storage cluster (e.g., storage cluster 418 in FIG. 4B and storage cluster 420 in FIG. 4C). Storage clusters 418, 420 may include one or more original single-node appliances (e.g., original single-node appliance 400 in storage cluster 418 and single-node appliances 400, 422 in storage cluster 420) and an internal remote system (e.g., internal remote system 424) configured to facilitate intra-cluster orchestration operations. In some implementations, internal remote system 424 may not be exposed to a user and may operate automatically behind the scenes.

In some implementations, on-demand high availability process 10 may generate 302 a remote system object representing the new single-node appliance in the internal remote system. For example, a remote system object (e.g., remote system object 426) is an object within a storage cluster (e.g., storage cluster 420 in FIG. 4C) that represents a remote storage location. In one example, remote system object 426 represents a remote cluster. In another example, remote system object 426 represents a remote system that is configured to extend a storage cluster as will be discussed in greater detail below.

In some implementations, on-demand high availability process 10 may determine 304 an appliance identifier for the remote system object representing the new single-node appliance. An appliance identifier may generally include a label used to individually distinguish single-node appliances from one another (e.g., "A1", "A2", etc.). It will be appreciated that any type of identifier (e.g., alphanumerical symbols, phrases, etc.). In some implementations, all appliances are generally assigned an appliance identifier upon manufacture. However, not all appliance identifiers are created equally. Non-zero appliance identifiers are generally used to identify single-node appliances that are intended to be used within a storage cluster, where the single-node appliances are automatically configured and added to a unique internal remote system. All other appliance identifiers have a "null" value, and single-node appliances that have "null" appliance identifiers are pre-set for normal appliance usage wherein a system administrator retains some control over the initial configuration of the appliance. Referring again to FIG. 4C, remote system object 426 may include an appliance identifier (e.g., appliance identifier 428) for single node appliance 422.

In some implementations and in response to determining that the appliance identifier for the remote system object representing the new single-node appliance is a non-zero appliance identifier, on-demand high availability process 10 may establish 306 an internal remote session between the remote system object and the storage cluster. For example, internal remote system 424 may interface with a unique appliance identifier. In some implementations, internal remote system 424 may use appliance identifier 428 for single-node appliance 422 and appliance identifier 430 for single-node appliance 400 that is included by default with each new single-node appliance upon assembly. In some implementations, if appliance identifier 428 holds a null value, then single-node appliance 422 may behave like a normal remote system that is fully configurable by the local administrator. However, if appliance identifier 428 holds a non-zero value, then it represents a single-node appliance (e.g., single-node appliances 422) within storage cluster 420. Intra-cluster orchestration operations may or may not go through public representational state transfer application programming interface (REST API) depending on implementation, but for internal remote system authentication, credentials are assumed to be known or available, via service accounts or some other mechanism. Unlike normal remote systems, each single-node appliance included within the local storage cluster may generally include a non-zero appliance identifier which may then be included as a remote system object representation of this local appliance. In other words, single-node appliances belonging to clusters may generally include non-zero appliance identifiers. Likewise, normal single-node appliances that are unaffiliated with any server clusters, may also generally have "null" appliance identifiers.

When storage cluster 420 is initially created, a new single-node appliance (e.g., single-node appliance 422) is added to a pre-existing multi-node storage cluster 418 and internal remote systems 424 are automatically initialized as a new step in a cluster expansion workflow. Therefore, for a three single-node appliance cluster 420 (e.g., as shown in FIG. 4G), remote system 424 configuration may behave as shown in Table 1 below:

TABLE 1

| Type | Appliance ID | Notes |
|---|---|---|
| X | A1 | Automatically initialized Internal remote system |
| X | A2 | Automatically initialized Internal remote system |
| X | A3 | Automatically initialized Internal remote system |
| X | NULL | Remote cluster of the same type X |
| Y | NULL | Remote storage system of type Y (cross-platform mobility) |

Table 1 shows five single-node appliances, four of which are of the same make and model. Only the first three entries represent single-node appliances that include non-zero values for their appliance identifiers (e.g., appliance identifier 428), specifically A1, A2, and A3. Accordingly, only the first three single-node appliances are recognized as part of a storage cluster. The fourth entry in Table 1 shows a remote cluster of the same type (e.g., type X). In this example, because this entry is associated with a cluster and not an individual appliance, the appliance identifier is null. Similarly, the fifth entry in Table 1 shows a remote cluster of a different type (e.g., type Y). In this example, the fifth entry is for a destination for cross platform mobility. As with the fourth entry, the fifth entry is associated with a remote cluster and not an individual appliance. As such, the appliance identifier is null. Accordingly, neither of them are recognized as part of a storage cluster. Similarly, when one of the original single-node appliances is removed from the storage cluster, the underlying internal remote session is automatically terminated.

In some implementations, on-demand high availability process 10 may present 308 the one or more original single-node appliances 400, and the new single-node appliance 422 as a unified system. When initially deployed, one of the original single-node appliances 400 is treated as a single-node appliance cluster 418. When a second single-node appliance (e.g., single-node appliance 422) is added to the cluster, a two node appliance cluster (e.g., storage cluster 420) is created. In some implementations, cluster 420 includes independent data paths 432 on each single-node appliance recognized as part of storage cluster 420, as shown in FIG. 4D. Further, storage cluster 420 may also include a control plane (e.g., control plane 434) that may graphically present all connected appliances as a single unified system from a management and operations perspective. For example, control plane 434 connects a primary control path (e.g., primary control path 436 on single-node appliance 400) with a secondary control path (e.g., secondary control path 438 on single-node appliance 422).

In some implementations, on-demand high availability process 10 may provision 306 one or more protected storage volumes on any of single-node appliances 400, 422 included in the unified system of storage cluster 420. Storage provisioning is the process of allocating and managing storage resources for applications and users in an enterprise environment. It involves planning, configuring, deploying, and monitoring the storage capacity, performance, availability, and security of the storage systems and networks.

Referring now to FIGS. 4E-4F, the unified system for two-node appliance cluster 420 allows for intra-cluster volume migration (e.g., represented by arrow 440 between single-node appliance 400 and single-node appliance 422). This means that it is possible to provision standard storage volumes to either of single-node appliances 400, 422, and that storage volumes 442, 444, 446 can be moved from single-node appliance 400 to single-node appliance 422, provided that they are both recognized as members of the storage cluster 420. By spreading standard storage volumes 442, 444, 446 across the two appliance nodes, failure of a single-node appliance will only lead to a data unavailability event for volumes stored on that particular server. Volumes 442, 444, 446 stored on the remaining single-node appliance will still be available, and a failed single-node appliance may be recovered, thereby restoring the unavailable volumes.

However, if one of the single-node appliances is permanently lost, then the corresponding data may also be permanently lost. To reduce the incidence of data loss events, on-demand high availability process 100 introduces two fundamental changes to the enterprise storage stack. First is internal remote system 424, which effectively re-purposes the existing metro remote functionality that is normally used in clustered storage systems, where metro volumes are enabled between two clusters that are isolated, geographically distributed, independent systems. In one example, some remote clusters are presented as remote systems in its object model. Such remote systems are generally configured manually by a storage administrator when metro-cluster functionality is desired. As mentioned before, internal remote system 424 may be automatically configured behind the scenes and is not meant to be exposed to the customer/user.

The second fundamental change is a new type of volume called a protected volume (e.g., protected volume 448). In the example, single-appliance clusters (e.g., storage cluster 420) only standard volumes 442, 444, 446 are supported. However, in multi-appliance clusters (e.g., storage cluster 420), a user may request to create a protected volume (e.g., protected volume 448). Protected volume 448 is created on single-node appliances in exactly the same way standard storage volumes 442, 444, 446 are created, and by performing a few additional steps using control plane 434. In particular, the volume provisioning service included in control plane 434 first searches for the best destination appliance on which to replicate data (e.g., on-demand high availability process 10 may select the single-node appliance with the lowest utilization). Next, control plane 434 identifies an internal remote session 424 using unique appliance identifier 428 for the destination appliance found in the previous step. Finally, internal remote session 424 is automatically established for the volume between appliances. In some implementations, the description above covers volumes, but the approach is also applicable to volume groups, virtual volumes, and other storage objects supported by the storage systems.

In some implementations, provisioning 310 one or more protected storage volumes 444 on any of the single-node appliances (e.g., single-node appliances 400, 422) included in the unified system may further include: selecting 312 a destination appliance to replicate data onto, at least partially based upon predefined criteria such as appliance utilization and searching 314 for internal remote system 424 with a matching non-zero appliance identifier 428, and automatically establishing 316 an internal remote session 424 between single-node appliances in the unified system for a volume from the one or more protected volumes 448.

In some implementations, on-demand high availability process 10 may remove 318 a selected single-node appliance from the storage cluster. Referring now to FIGS. 4F-4G, in multi-node storage clusters (e.g., storage cluster 420), storage volume 448 can either be directly created as a protected volume from the start, as described above, or a standard storage volume (e.g., standard storage volume 442) may be promoted to become protected volume 448. This is useful when a second single-node appliance 400 is added to storage cluster 420 and existing standard volumes 442, 444, 446 need to be protected. The same approach as described above will work, but the paths on the destination appliance may not be enabled until the initial copy is complete.

Removing 318 a selected single-node appliance from the storage cluster may include excluding 320 the selected single-node appliance from a list of possible destinations, such that no new protected volumes can be created thereon. In this context, the list of possible destinations comprises any single-node appliance currently recognized as a part of multi-node storage cluster. After the selected appliance is excluded 320 to prevent new volumes from being created, on-demand high availability process 10 removes 318 selected single-node appliance by locating and terminating 322 any active internal remote sessions connected to selected single-node appliance.

In some implementations, on-demand high availability process 10 may define an independent data path 432 on each of the single-node appliances included in the unified system. For example and as shown in FIG. 4G, when single-node appliance 450 is added with appliance identifier 452 and a secondary control path 454, data path 423 may be defined on single-node appliance 450 and connected for intra-cluster volume migration as shown by arrow 456 between single-node appliance 422 and single-node appliance 450.

In some implementations, enabling internal remote function 424 on the new single-node appliance 422 may include automatically initializing, and maintaining the new single-node appliance. When storage cluster 420 is initially created, a new single-node appliance (e.g., single-node appliance 422) is added to a pre-existing multi-node storage cluster 420, and internal remote functions 428 are automatically initialized as a new step in a cluster expansion workflow.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method for providing on-demand high-availability service on a storage cluster, comprising:
  adding a new single-node appliance to the storage cluster, wherein the storage cluster includes one or more original single-node appliances and an internal remote system configured to facilitate intra-cluster orchestration operations;
  generating a remote system object representing the new single-node appliance in the internal remote system;
  determining an appliance identifier for the remote system object representing the new single-node appliance;

in response to determining that the appliance identifier for the remote system object representing the new single-node appliance is a non-zero appliance identifier, establishing an internal remote session between the remote system object and the storage cluster;

presenting the one or more original single-node appliances and the new single-node appliance as a unified system; and provisioning one or more protected storage volumes on any of the single-node appliances included in the unified system, wherein provisioning the one or more protected volumes includes identifying the internal remote session with a matching non-zero appliance identifier.

2. The computer-implemented method of claim 1, wherein provisioning the one or more protected volumes includes selecting a destination appliance to at least partially replicate data onto.

3. The computer-implemented method of claim 1, wherein provisioning the one or more protected volumes includes automatically establishing the internal remote session between single-node appliances in the unified system for a protected volume from the one or more protected volumes.

4. The computer-implemented method of claim 1, further comprising:

removing a selected single-node appliance from the storage cluster.

5. The computer-implemented method of claim 4, wherein removing the selected single-node appliance from the storage cluster includes excluding the selected single-node appliance from a list of possible destinations, such that no new protected volumes can be created thereon.

6. The computer-implemented method of claim 5, wherein removing the selected single-node appliance from the storage cluster includes locating and terminating any internal remote sessions to the selected single-node appliance.

7. A computer program product residing on a non-transitory computer- readable medium having a plurality of instructions stored thereon which, when executed by a processor, cause the processor to perform operations comprising:

adding a new single-node appliance to the storage cluster, wherein the storage cluster includes one or more original single-node appliances and an internal remote system configured to facilitate intra-cluster orchestration operations;

generating a remote system object representing the new single-node appliance in the internal remote system;

determining an appliance identifier for the remote system object representing the new single-node appliance;

in response to determining that the appliance identifier for the remote system object representing the new single-node appliance is a non-zero appliance identifier, establishing an internal remote session between the remote system object and the storage cluster;

presenting the one or more original single-node appliances and the new single-node appliance as a unified system; and provisioning one or more protected storage volumes on any of the single-node appliances included in the unified system, wherein provisioning the one or more protected volumes includes identifying the internal remote session with a matching non-zero appliance identifier.

8. The computer program product of claim 7, wherein provisioning the one or more protected volumes includes selecting a destination appliance to at least partially replicate data onto.

9. The computer program product of claim 7, wherein provisioning the one or more protected volumes includes automatically establishing the internal remote session between single-node appliances in the unified system for a protected volume from the one or more protected volumes.

10. The computer program product of claim 7, wherein operations further comprise:

removing a selected single-node appliance from the storage cluster.

11. The computer program product of claim 10, wherein removing the selected single-node appliance from the storage cluster includes excluding the selected single-node appliance from a list of possible destinations, such that no new protected volumes can be created thereon.

12. The computer program product of claim 11, wherein removing the selected single-node appliance from the storage cluster includes locating and terminating any internal remote sessions to the selected single-node appliance.

13. A computing system for providing on-demand high-availability service on a storage cluster, comprising:

a memory; and a processor configured to:

add a new single-node appliance to the storage cluster, wherein the storage cluster includes one or more original single-node appliances and an internal remote system configured to facilitate intra-cluster orchestration operations;

generate a remote system object representing the new single-node appliance in the internal remote system;

determine an appliance identifier for the remote system object representing the new single-node appliance;

in response to determining that the appliance identifier for the remote system object representing the new single-node appliance is a non-zero appliance identifier, establish an internal remote session between the remote system object and the storage cluster;

present the one or more original single-node appliances and the new single-node appliance as a unified system; and provision one or more protected storage volumes on any of the single-node appliances included in the unified system, wherein provisioning the one or more protected volumes includes identifying the internal remote session with a matching non-zero appliance identifier.

14. The computing system of claim 13, wherein provisioning the one or more protected volumes includes selecting a destination appliance to at least partially replicate data onto.

15. The computing system of claim 13, wherein provisioning the one or more protected volumes includes automatically establishing the internal remote session between single-node appliances in the unified system for a protected volume from the one or more protected volumes.

16. The computing system of claim 13, wherein the processor is further configured to:

remove a selected single-node appliance from the storage cluster.

17. The computing system of claim 16, wherein removing the selected single-node appliance from the storage cluster includes excluding the selected single-node appliance from a list of possible destinations, such that no new protected volumes can be created thereon.

\* \* \* \* \*